(12) United States Patent
Theiler

(10) Patent No.: US 6,270,558 B1
(45) Date of Patent: Aug. 7, 2001

(54) DEVICE FOR SEPARATING FROM A GAS STREAM LIQUIDS AND/OR SOLID MATTERS OR GASES HAVING A DIFFERENT SPECIFIC WEIGHT

(76) Inventor: Anton Theiler, Dobl 13, D-94577, Winzer (DE)

( * ) Notice: Subject to any disclaimer, the term of this patent is extended or adjusted under 35 U.S.C. 154(b) by 0 days.

(21) Appl. No.: 09/319,352

(22) PCT Filed: Dec. 4, 1997

(86) PCT No.: PCT/DE97/02834

§ 371 Date: Jul. 6, 1999

§ 102(e) Date: Jul. 6, 1999

(87) PCT Pub. No.: WO98/24533

PCT Pub. Date: Jun. 11, 1998

(30) Foreign Application Priority Data

Dec. 6, 1996 (DE) ............................................. 296 21 183

(51) Int. Cl.⁷ ............................. B03C 3/15; B01D 45/16; B01D 45/18
(52) U.S. Cl. .................... 96/61; 55/282.3; 55/434.2; 55/459.1; 55/459.4; 55/463; 55/DIG. 10
(58) Field of Search ................................ 55/459.1, 459.4, 55/459.5, 463, 434.2, 282.3, DIG. 10; 210/512.1; 96/61

(56) References Cited

U.S. PATENT DOCUMENTS

| | | | |
|---|---|---|---|
| 3,177,634 | * 4/1965 | Latham, Jr. et al. | 55/463 X |
| 3,259,246 | * 7/1966 | Stavenger | 55/459.1 X |
| 3,972,698 | * 8/1976 | Klein et al. | 210/512.1 X |
| 4,138,020 | * 2/1979 | Steiner et al. | 55/463 X |
| 4,260,401 | * 4/1981 | Truhan et al. | 55/463 X |
| 4,378,289 | * 3/1983 | Hunter | 210/512.1 X |
| 4,859,347 | * 8/1989 | Simon et al. | 210/512.1 X |
| 5,178,656 | * 1/1993 | Schott | 55/463 X |

FOREIGN PATENT DOCUMENTS

| | | |
|---|---|---|
| 849349 | * 9/1952 | (DE) . |
| 2526056A1 | 1/1976 | (DE) . |
| 3915552A1 | 11/1990 | (DE) . |
| 4226997A1 | 2/1993 | (DE) . |
| 2147545 | * 3/1973 | (FR) . |
| 2084904 | * 4/1982 | (GB) . |
| 2098514 | * 11/1982 | (GB) . |

OTHER PUBLICATIONS

German Patent Office Search Report dated Mar. 10, 1997.

* cited by examiner

*Primary Examiner*—Richard L. Chiesa
(74) *Attorney, Agent, or Firm*—Dominque & Waddell, PLC (57) ABSTRACT

Apparatus for separating fluids and/or solid matter or gases having different specific weight from a gas flow. The apparatus includes a gas inlet connector and a gas outlet connector. The apparatus contains a tube like cavity which conically is enlarged from the gas inlet connector to the gas outlet connector. Also included is an auxiliary gas inlet passage that opens to the cavity in proximity to the gas inlet connector tangentially to the lateral area of the cavity.

23 Claims, 12 Drawing Sheets

DEVICE FOR SEPARATING FROM A GAS STREAM LIQUIDS AND/OR SOLID MATTERS OR GASES HAVING A DIFFERENT SPECIFIC WEIGHT

This application is a National Stage of International Application No. PCT/DE97/02834 filed on Dec. 4, 1997.

The invention relates to an apparatus for separating fluids and/or solid matter or gases with a different specific weight from a gas flow.

For separating fluids and/or solid matter from a gas flow there already are known filters in which the gas flow to be cleaned is passing through a filter body. These known constructions, however, have the disadvantage that a substantial energy consumption is necessary to force the gas flow through the filter body. Further over the time the filter body becomes clogged and thereafter has to be cleaned or has to be replaced. This leads to high expenditure in maintenance and further such apparatus is not constantly available.

To separate gases with a different specific weight from a gas flow containing a mixture of gases, there already are known systems containing separating nozzles for demixing the gases as these for example are used for separating the uranium isotopes 235 and 238. Apparatus of this kind, however, are very complex in their construction and very expensive.

Followingly, it is an aim of the instant invention to provide an apparatus for separating fluids and/or solid matter or gases with a different specific weight from a gas flow which only needs very little energy, is simple to produce and needs very little maintenance.

According to the invention, this task is solved by the fact that the apparatus is having a tube-like cavity which conically is enlarging from the gas entrance connector to the gas outlet connector into which close to the gas entrance connector an auxiliary gas entrance opening is leading tangentially to the lateral area of the cavity.

This filter according to the invention has the advantage that it is working completely independent from the orientation thereof and further is not having a differential pressure (pressure-loss) if the size is in proper relation to the flow. With a corresponding dimensioning, the filter can suck-in the gas to be cleaned and automatically can expel the separated fluid or a separated fraction of gas with higher molecular weight.

In this connection, it is preferred that the auxiliary gas entrance opening is inclined in the direction of the gas exit connector with respect to the central axis of the cavity such that the auxiliary gas is guided in a helical path along the lateral area of the cavity in the direction of the gas exit connector.

By this, the suction at the gas entrance connector is improved and further a bleeding of the auxiliary gas from the gas entrance connector is avoided.

Further, it is especially preferred to position a filler body in the cavity having a smaller diameter and the same conicalness such that the cavity is having the shape of a hollow truncated cone with a basically constant wall thickness. By this it is avoided that close to the gas exit connector in the middle of the gas column, a low pressure is formed which could suck-back gas from the gas exit region.

In this connection, it is especially preferred that the filler body is extended almost up to the height of the auxiliary gas entrance connector. By this, the separating action further is improved.

An especially advantageous embodiment is one where the filler body is mounted in the cavity by means of a sealing element which is sealingly closing the cavity close to the gas exit connector and in which the filler body is hollow and open in the direction of the gas exit connector and is at least having one lateral opening for the gas. By this construction, it is achieved that the exhausting gas fraction is as clean as possible.

In this connection, further it is especially preferred that the opening(s) is (are) having the shape of an elongated slot extending parallel to the central axis of the filler body. By this, the flow resistance for the gas flow can be minimized.

Further, it is especially preferred to perform the sealing element as an electric insulator and to provide a source of direct current which electrostaticly is charging the filler body with respect to the wall of the cavity. This embodiment is especially suitable to separate droplets of fluids or solid matter from the gas flow. Here, namely, an additional electrostatic cleaning is achieved. This technology is especially suitable if the cleaned gas flow after the gas exit should be burned or should be fed into a waste gas catalysator. The nitrogen oxides and ozone gases formed by the electrostatic charging are advantageous in a following combustion.

For separating fluids and gases having a different specific weight, it is especially preferred to position the exit opening for the separated fluids immediately in front of the sealing element in the wall of the cavity.

If only one opening is provided in the filler body, then it is especially preferred to position the exit opening on the opposite side of the filler body with respect to the above opening.

To exclude a flowing-out of the auxiliary gas from the gas entrance connector more safely, it is especially preferred to provide a baffle or step at the gas entrance connector decreasing the cross-sectional area of the cavity.

Further, it is especially preferred to provide the auxiliary gas entrance opening with a nozzle because by a high entrance velocity of the auxiliary gas into the cavity, a good separating action with low amounts of auxiliary gas can be achieved.

A constructively, especially simple solution of the task to be solved by the invention, is achieved if the gas entrance and the gas exit connector each centrally are positioned in and each one end surface of the cavity shaped like a truncated cone.

In practical tests carried out up to now, the following dimensions have proved to be especially of advantage:

The angle $\alpha$ between the central axis of the auxiliary gas entrance opening and the central axis of the cavity pointed to the gas exit opening between 90,5 degrees to 100 degrees, preferably 90,5 degrees to 92 degrees.

The angle $\beta$ of the incline of the conically shaped parts (cavity and possibly filler body) with 0,5 to 15 degrees, preferably 1 to 5 degrees.

If by means of the apparatus according to the invention, for example soot particles from fuel oil should be separated from the exhaust gases of Diesel engines, it is especially preferred to provide electrical heating resistors on the lateral area of the cavity to burn-off solid matter separated from the gas flow.

In this connection, it is especially preferred to perform the electric heating resistors as helical heater windings extending in the direction of flow of the auxiliary gas. The heating resistors in this connection are functioning additionally as "guides" for the flow of the mixture consisting of auxiliary gas and gas to be cleaned.

Further, a suck-off tube can extend into the cavity along the central axis of the cavity from the gas exit connector thereof. By this, an especially clean light fraction of the gas mixture can be sucked-off.

As far as already there is a filler body having an inner cavity, then the suck-off tube preferably is extending into the cavity of the filler body and is extended within the filler body to the proximity of the gas entry end of the filler body. By this, the cleaning action further can be improved.

Further, the cleaning action still can be improved by providing a seal between the filler body and the suck-off tube at the first third of the length on the gas entry side of the lateral opening(s).

An especially good cleaning action can be obtained if the filler body is provided with a head at its front end which is formed by a constriction with respect to the remainder of the filler body.

In this connection, it is preferred that the constriction is having a diameter which is less than one third of the diameter of the head.

A very good efficiency of the apparatus is obtained if the diameter of the head is larger than the diameter of the filler body in its conical section.

In a preferred embodiment of the invention, the head is formed as a flat cylinder, the lateral area of which is having the same conicalness as the filler body, wherein the head is forwardly ending in a flat cone.

In the following, the invention more detailedly is described with reference to the embodiment shown in the drawings.

Figure 1:
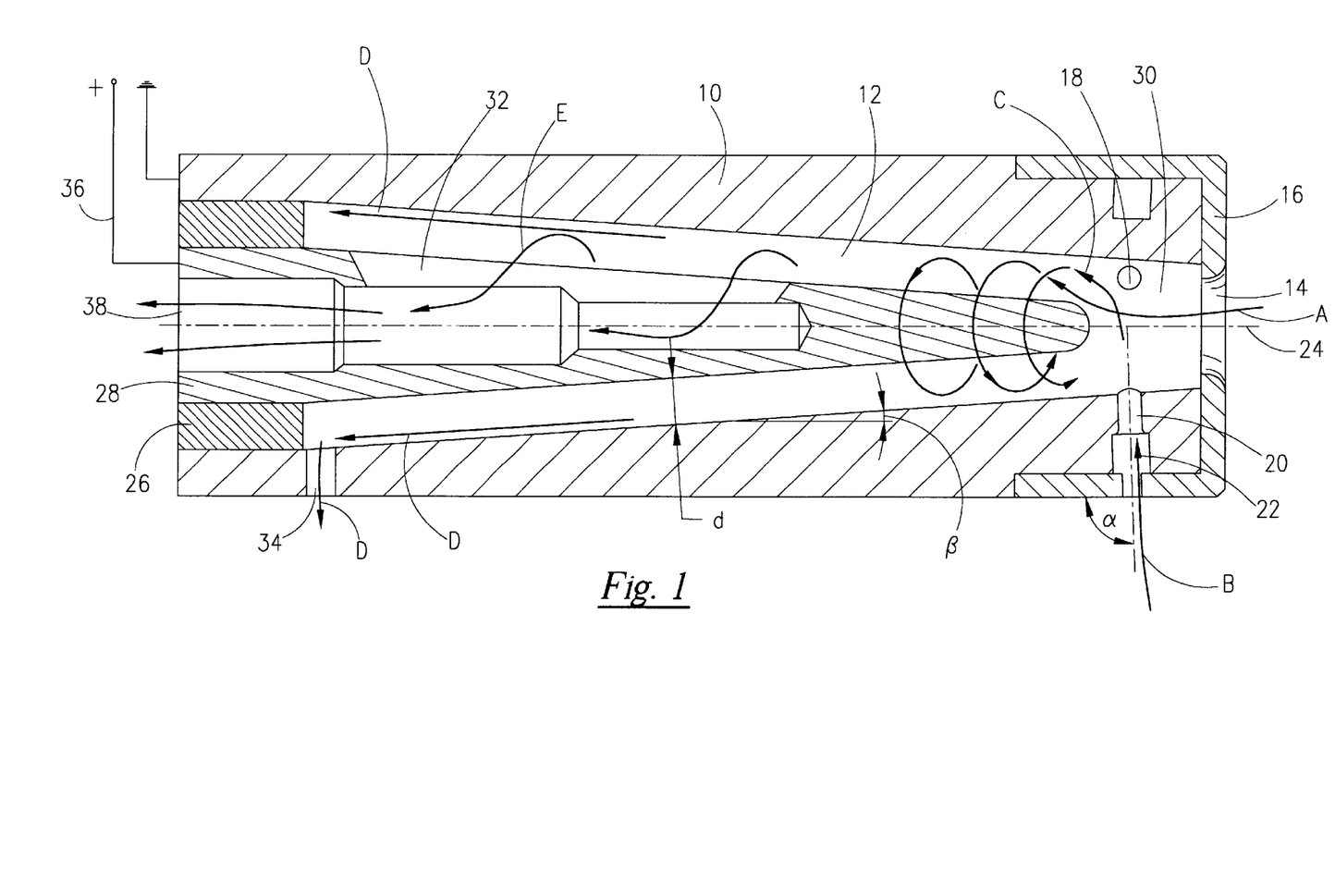
FIG. 1 is showing a sectional representation of the apparatus according to the invention which preferably is used for separating fluids.
Figure 2:
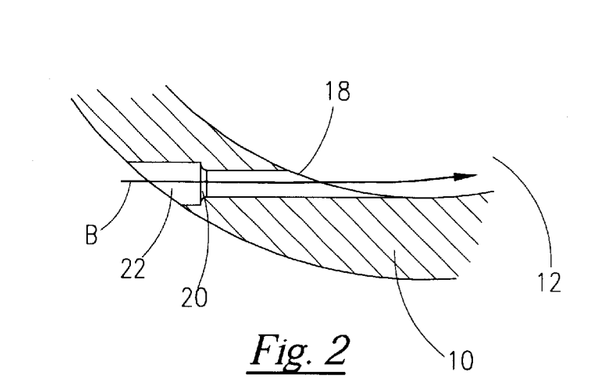
FIG. 2 is showing a detail of the auxiliary gas entry opening according to FIG. 1 in a cross-section normal to the central axis of the cavity.

The embodiment of the invention shown in FIGS. 1 and 2 is especially suitable for separating fluids from a gas flow. The apparatus shown is having a housing in which there is formed a dynamically balance cavity 12. The cavity 12, in the drawing on the right hand side, is having a gas entry connector 14. In the embodiment shown, this gas entry connector 14 is circumferentially constricted by a screen 16 projecting into the open cross-section of the cavity such that an opening concentric to the cavity 12 is formed having a diameter which is smaller than the smallest diameter of the cavity 12. Within the cavity 12, in proximity to the gas entry opening 14, there is provided an auxiliary gas entry opening 18 which is opening tangentially to the inner lateral area of the housing 10. The detailed design of this auxiliary gas entry opening 18 is more clearly shown in the detailed representation of FIG. 2. From this especially it can be learnt that the auxiliary gas entry opening 18 is forming a nozzle 20 which is connected to the auxiliary gas supply 22.

As further it can be learnt from FIG. 1, the auxiliary gas entry opening 18 is not exactly normal to the central axis 24 of the cavity but instead is having an angle α between the central axis of the auxiliary gas entry opening and the central axis 24 of the cavity 12 which is slightly larger than 90 degrees which means that the opening slightly is pointing in the direction of the gas exit.

The cavity 12 continuously is enlarged up to its end on the gas exit side. At this end, by means of an electrically insulating annular seal 26, a filler body 28 is mounted. The filler body 28 is having the same conicalness as the lateral area of the cavity 12. This conicalness is defined by the angle β between the central axis 24 of the cavity 12 and the lateral area of the cavity 12 or the outer surface of the filler body 28, respectively. Preferably, this angle β is about 2,5 degrees. The filler body 28 therefore is filling the cavity 12 such that a hollow area is formed having generally a constant wall thickness d of preferably 4 millimeters. At the gas entry end 30, the filler body 28 can have a rounded shape. Preferably, the gas entry end 30 of the filler body 28 is positioned about at the height of the auxiliary gas entry connector 18 or slightly on the gas exit side thereof. The filler body 28 on the inside is hollow up to about two thirds of its length. This cavity of the filler body is in communication with the cavity 12 by means of one or more longitudinal slots 32. These slots 32 are preferably extending parallel to the central axis 24 of the cavity 12.

On the gas exit end of the cavity 12, shortly in front of the seal 26, there is provided a fluid exit opening 34 in the housing 10 which is connecting the lateral area of the cavity 12 with a fluid removal line.

If only one slot 32 as a gas exit is provided in the filler body 28, then the fluid exit opening 34 preferably is positioned opposite thereto. In such a case, it is recommended if the apparatus is operated in a defined orientation to choose this orientation such that the exit opening 34 is on the bottom side thereof while the slot 32 is on the top side of the filler body.

To further improve the separation of droplets of fluids or of solid matter from the gas flow, there is provided a DC-high voltage connector 36 which is charging the filler body 28 with respect to the housing 10 electrostaticly.

The embodiment shown in FIGS. 1 and 2 is operating as follows: The gas flow to be cleaned is fed along the arrow A via the gas entry connector 14 into the cavity 12. By means of the auxiliary gas inlet 22 a gas having overpressure which in the most simple case is pressurized air, is supplied, as shown by arrow B. By the nozzle action of the auxiliary gas entry opening 18 or by an additional nozzle 20, the pressurized auxiliary gas is substantially accelerated which means that it is moving with high velocity along the lateral area of the cavity in helical paths as this is shown in FIG. 1 by the arrows C. Because of the tangential flow of the auxiliary gas, a gas layer is formed on the lateral area of the cavity 12 which is rotating with a high velocity. This gas layer is entraining the gas mixture to be cleaned and fed in along arrow A and implies a corresponding rotation to this gas mixture. Doing so, along the central axis of the cavity 12 a low pressure is created because of the rotation of the gas and the centrifugal force. The screen 16 projecting into the gas entry opening 14 prevents that the rotating gas mixture can flow out from the lateral area of the cavity 12 in the direction of the gas entry opening.

Due to the conicalness of the lateral area of the cavity 12 and due to the auxiliary gas entry opening being inclined by the angle α of preferably 91 degrees, the gas flow helically is moved from the gas entry connector 14 of the apparatus in the direction of the gas exit connector 38. During this movement, floating bodies (solid particles and/or droplets of fluid) are separated on the lateral area of the cavity 12 and further then are moved by the continueing gas flow up to the seal 26 where they are collected and where under suitable operating conditions they are removed through the exit opening 34.

In cases where by means of the apparatus according to FIG. 1, for example exhaust gases of Diesel-engines should be cleaned, preferably pressurized air is used as the auxiliary gas (for example from the pressurized air system usually present in larger Diesel-vehicles). Because of the fact that the solid matter particles separated along the lateral area of the cavity 12 are not fluid, these only very difficulty can be moved in the direction of the seal 26. It can be expected that these solid particles are sticking to the lateral area. Due to the fact, it however, that these particles easily can be burned, one can provide at the lateral area 12 electric heating windings which preferably, too, are extending helically as the path of the gas mixture. Depending from the presence of soot particles then these heating resistors by a short current impulse can be brought to glow, whereby the burning of the soot particles is initiated. A very short current impulse in this connection if sufficient since the burning of the soot particles is an exothermic reaction with no further energy necessary. The soot particles then are burned to harmless $CO_2$.

If fluids, as for example oils, should be separated, these are following the arrows D and can be removed at the exit opening 34. If only solid matter is to be separated, as for example Diesel-soot followed by a combustion thereof, obviously the exit opening 34 is not necessary.

The cleaned gas, which is specific lighter, is collected at the surface of the filler body 28. From there it can flow through the slot(s) 32 as shown by arrow B to the gas exit connector 38. When separating fluids from a gas flow, it is of further advantage that the auxiliary gas by means of the nozzles 20 and/or the auxiliary gas exit opening 18 is expanded. By this it is cooled which means that additional fluid which is not condensed and contained in the gas flow can be condensed which means that additional fluid can be separated.

To improve this effect, the auxiliary gas can be fed in under very high pressure or already pre-cooled. For cleaning gas flows chemically as an auxiliary gas, for example a special gas can be used, which is causing the precipitation of the substances contained in the gas flow or steam flow to be cleaned. For example, by this hydrogen chloride gas can be separated from a gas flow by using ammonia as an auxiliary gas. Doing so, $NH_4Cl$ particles are formed which are collected on the wall of the housing and which for example by the addition of water or water-steam go into solution and can be removed in solution.

As mentioned above, the removal of the cleaned gas flow is occurring by means of the slot(s) 32 in the filler body 28, wherein such slots are extending from the gas exit end of the cavity 12 up to about the middle thereof. In this connection, it is of importance that the filler body 28 is extended close to the auxiliary gas entry opening 18 because by the filler body 28 it is prevented that already cleaned parts of the gas flow which already have lost velocity can in the core of the filter move from the exit side to the entry side. This danger is due to the fact that without a filler body 28 close to the rotational axis 24 there would be a low pressure in the cavity 12.

The apparatus described above can be used for separating gas mixtures having different specific weights. In these cases, the heavier gas fraction is collected at the lateral area of the cavity 12 and can be removed through the exit opening 34. Through the gas exit connector 38 then basically only the lighter fraction is flowing. In this way, the apparatus according to the invention even could be used for separating isotopes.

Figure 3:
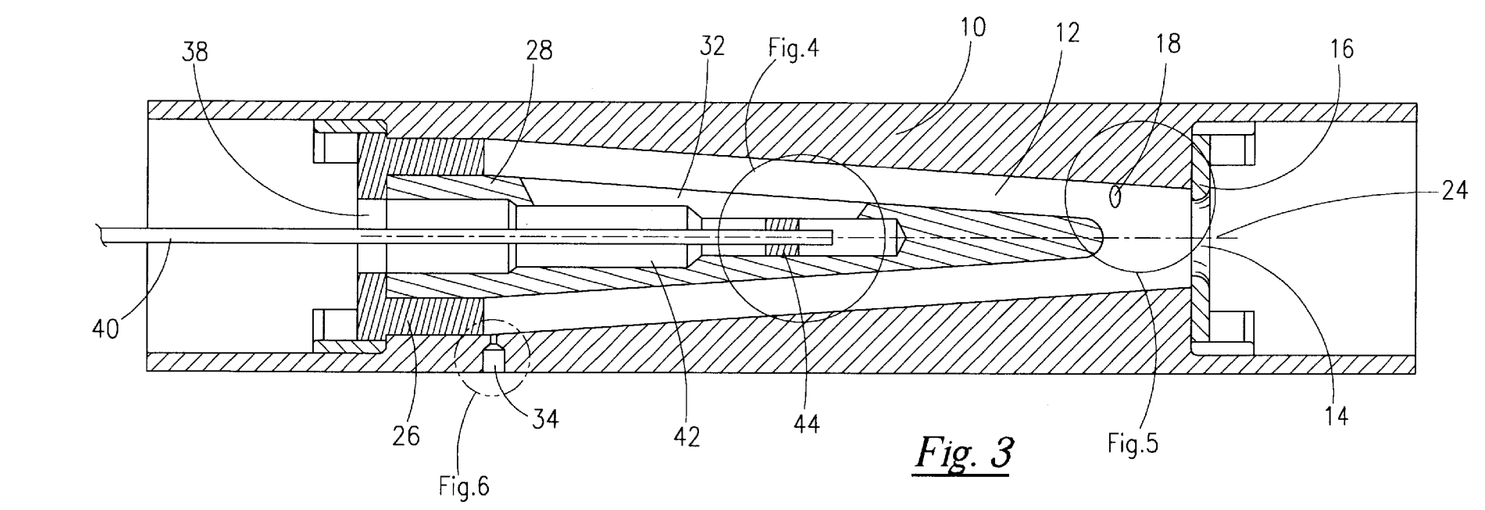
FIG. 3 is showing an apparatus according to the invention for separating gases with the different specific weight from a gas flow in a cross-section along the central axis of the cavity.

FIG. 3 is showing an embodiment of the invention which especially is suitable for separating gas mixtures having different specific weights.

This apparatus is having a close similarity with the above apparatus described with reference to FIG. 1. In this case, too, there is provided the housing 10 enclosing a dynamically balanced cavity 12 which is steadily and conically enlarged from the gas entry connector 14 to the gas exit connector 38. The gas entry connector 14 here, too, is constricted by a screen 16. Close to the gas entry connector 14 again there is provided an auxiliary gas entry opening 18 which again is tangentially to the lateral area of the cavity 12 and is inclined by an angle of one or more degrees with respect to the normal in the direction of the gas entry connector 38.

Again a filler body 28 is provided which is mounted in the cavity 12 by means of a seal 26 and which basically is having the same conicalness as the cavity 12 which, however, continuously is having a diameter which is a couple of millimeters smaller. Here, too, the filler body 28 is extended up to the height of the auxiliary gas entrance opening 18. In this case, too, the filler body 28 is hollow and is having a gas exit slot 32 which in longitudinal direction is extending in parallel to the rotational axis 24 of the cavity 12 about from the middle of the cavity 12 but to the gas exit end thereof. In this case, too, an exit opening 34 is provided in proximity to the gas exit end of the cavity 12.

Additionally, in this case a small tube 40 is extending through the gas exit connector 38 into the hollow cavity 42 of the filler body 28. The tube 40 is shortly ending before the gas entry side end of the cavity 42 in the filler body 28. Preferably, the cavity 42 in the filler body 28 is extended in the direction of the gas entry connector 14 further than the slot 42. The tube 40 preferably ends about at the height of the gas entry side end of the slot 32 and is sealingly fixed by means of an annular seal 44 on the gas exit side shortly before its end such that the seal 44 completely is sealing off the cavity 42 in the filler body 28.

Figure 4:
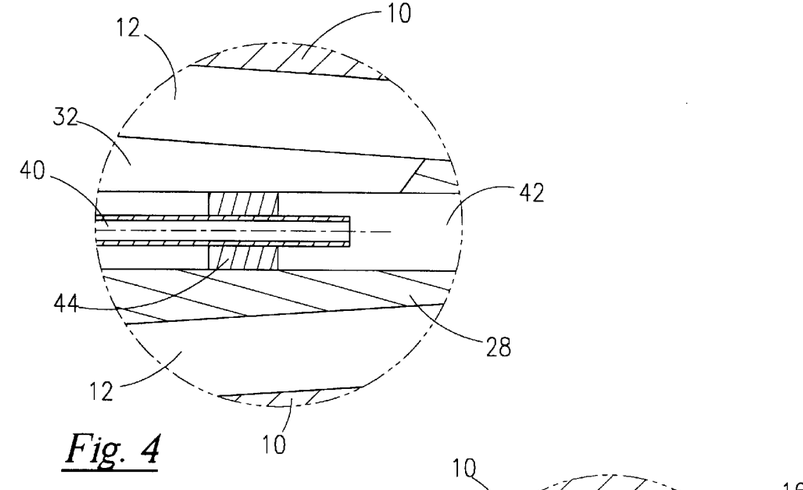
FIG. 4 is showing a detail of the seal connection for the suckoff tube for light fractions according to FIG. 3.
Figure 5:
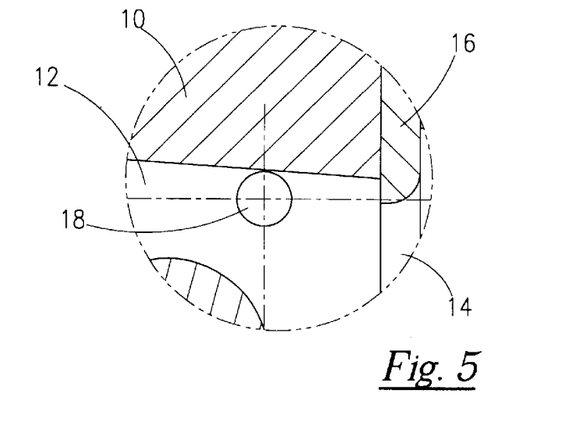
FIG. 5 is showing an enlarged detail of FIG. 3 showing the auxiliary gas entry opening in a top view.
Figure 6:
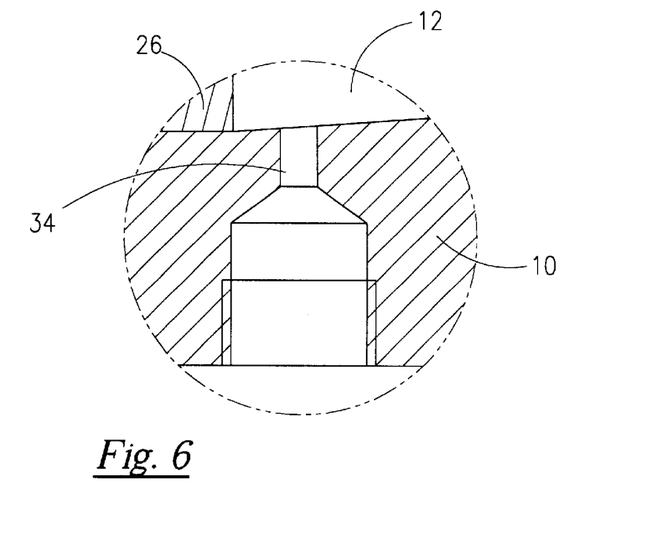
FIG. 6 is showing a detail of the opening for removing the heavy gas fraction according to FIG. 3.

FIGS. 4, 5 and 6 each are showing enlarged details of parts being of special interest for the invention (FIG. 5 the auxiliary gas entrance opening 18, FIG. 4 the position of the tube 40 and FIG. 6 the position of the exit opening 34).

Figure 7:
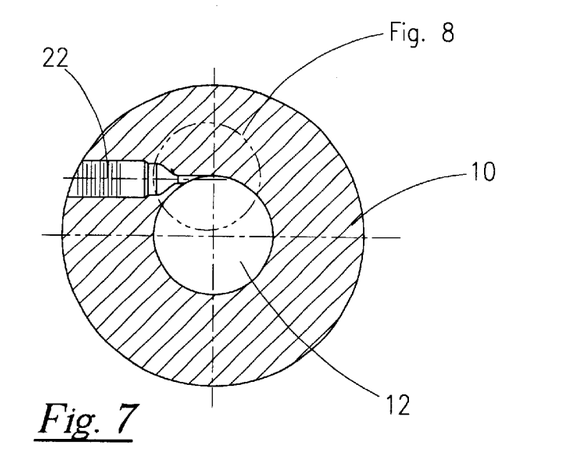
FIG. 7 is showing a cross-section normal to the central axis of the apparatus according to FIG. 3 in the height of the auxiliary gas entry opening.
Figure 8:
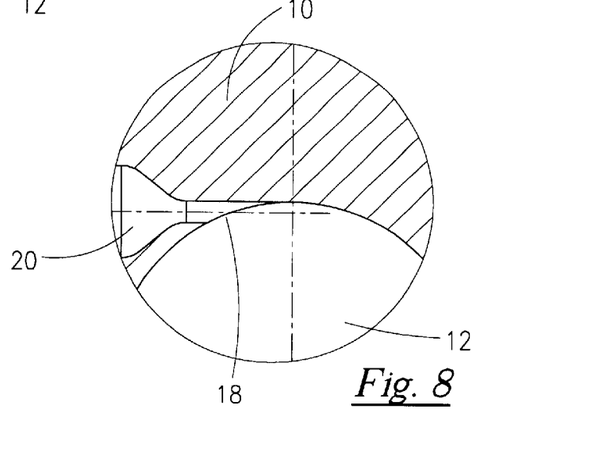
FIG. 8 is showing an enlarged detail of FIG. 7 showing the auxiliary gas entry opening.

FIGS. 7 and 8 show the auxiliary gas entrance opening 18 in cross-section, wherein the section is normal to the central axis 24 of the cavity 12. From FIG. 8, the tangential feeding of the auxiliary gas is especially clear.

The apparatus shown in FIGS. 3 to 8 is especially suitable for separating gas mixtures consisting of gases with different specific weights. The function of the apparatus is similar to the function of the apparatus described above with reference to FIG. 1. Here merely the gas mixture to be separated is used as the auxiliary gas, too. Through the exit opening 34 a gas mixture which is enriched with respect to the heavier fraction can be withdrawn while through the tube 40 a gas mixture can be withdrawn which is enriched with respect to the lighter fraction. The movement of the gas basically is corresponding to the arrows in FIG. 1. At the gas exit end of the cavity 12 in this case merely the heavier fraction of the gas mixture is collected.

Figure 9:
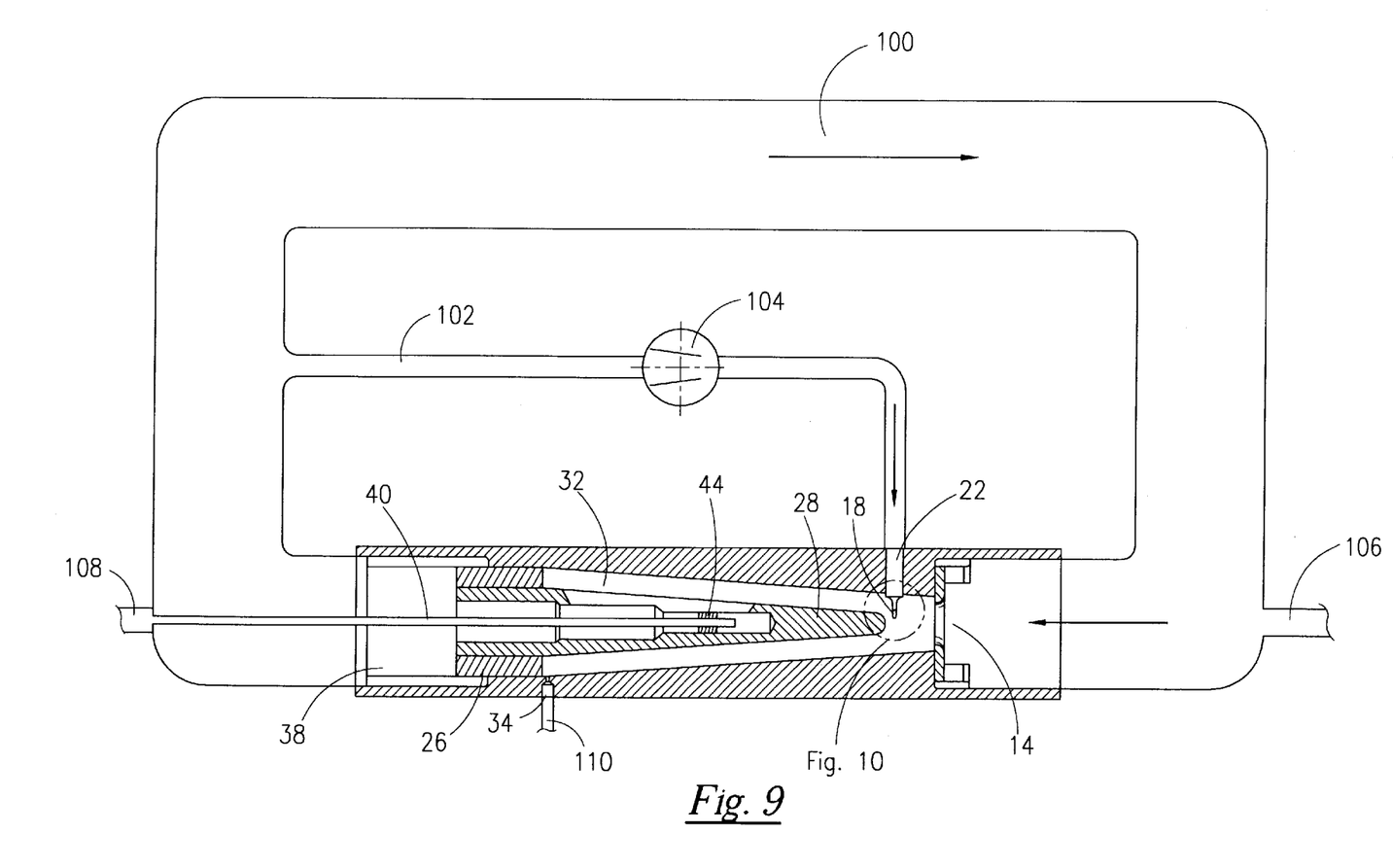
FIG. 9 is showing the apparatus according to the invention for removing gases with a different molecular weight, when used in a system for separating gases, in a cross-section along the central axis of the cavity and parallel to the central axis of the auxiliary gas entry connector.

FIG. 9 shows the use of the present invention to separate a gas mixture into fractions with different specific weights. Here the gas exit connector 38 of the apparatus according to the invention by means of a circulation line 100 is connected to the gas entry connector 14 such that the main amount of the gas mixture can be circulated. An auxiliary gas line 102 is branching off said circulation line 100. This auxiliary gas line by means of a compressor 104 is feeding the necessary auxiliary gas under pressure to the auxiliary gas entry opening 18. By means of a feed-line 106, new gas mixture to be separated is fed in in proximity to the gas entry connector 14. By means of the tube 40, a gas mixture heavily enriched with respect to the lighter fraction is fed into the exit line 108 for the lighter fraction. The mixture enriched with respect to the heavier fraction is fed through the exit opening 34 to a corresponding exit line 110. In this way, a very good separation of the different gas fractions is possible because the gas mixture is passing the apparatus long enough until a sufficient enrichment is achieved and the correspondingly enriched constituents then can be removed through the lines 108 and 110.

Figure 10:
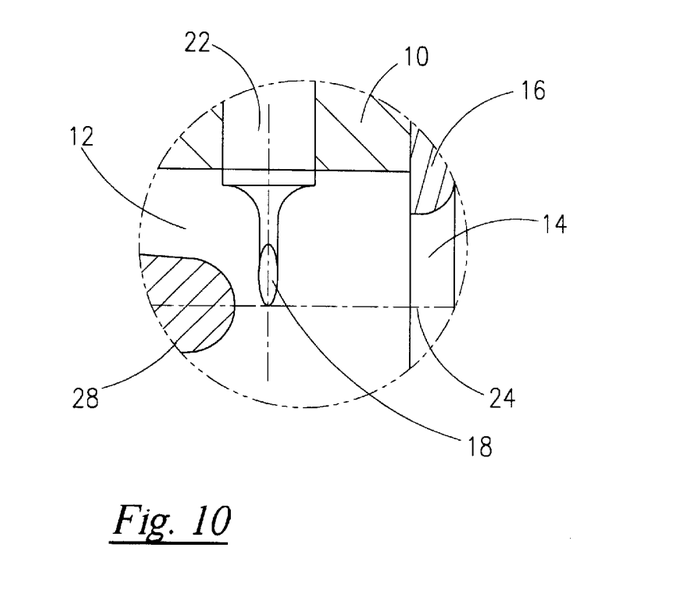
FIG. 10 is showing a detail of FIG. 9 regarding the auxiliary gas entry connector.

FIG. 10 is showing the detail of FIG. 9 in a lateral view of the auxiliary gas entry opening 18. The apparatus according to FIGS. 9 and 10 can work with over-pressure as well as with low pressure. Having low pressure in the gas mixture circuit gives the advantage of a higher exit velocity at the auxiliary gas exit opening, whereby a higher rotational speed and correspondingly a higher centrifugal force is created.

The removal of the lighter fraction through the tube 40 can be performed, too, by means of slots in this tube 40, wherein these slots can be inclined toward the rotational direction or away from it.

The removal of the heavier fraction instead by means of an exit opening 34 for example can be performed via axial slots, radial gaps or bores. For example, so-called "peel-off-slots" could be used.

With suitable gas mixtures here, too, a kind of fractionizing can be performed by removing in different places fractions each having different specific weights.

In apparatus of such kind at the corresponding locations valves could be provided which makes it possible to pre-evacuate the apparatus if a special purity of the gas mixture is necessary or if gas mixtures should be processed which are incompatible with the constituents of the air or with humidity.

Further, there is the possibility to substitute the filler body completely by a removal tube in the area of the central axis of the cavity.

Figure 11:
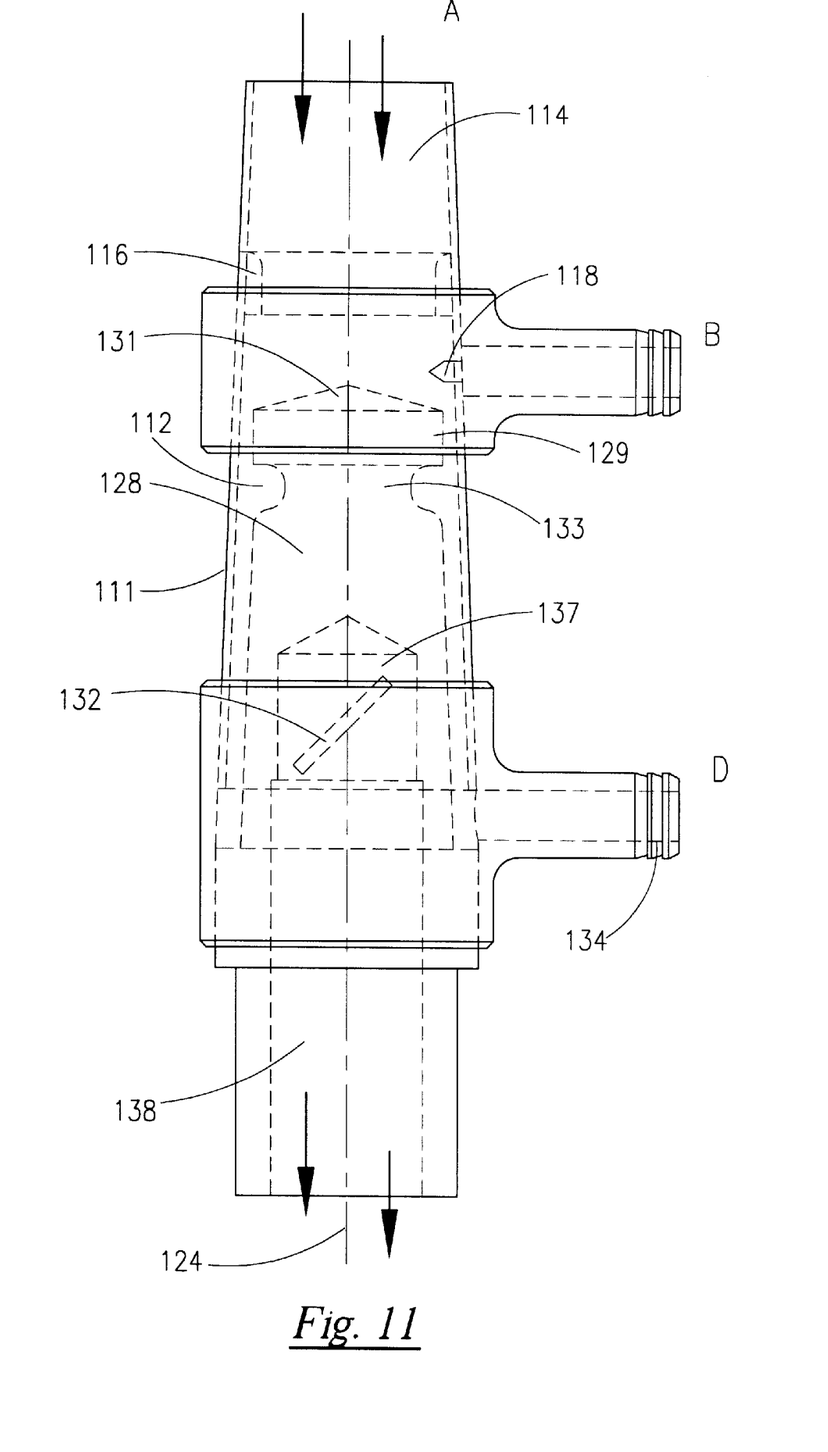
FIG. 11 is showing a representation of an especially preferred embodiment of the invention in a side view, wherein the contours of the inner parts are shown in dotted lines.
Figure 12:
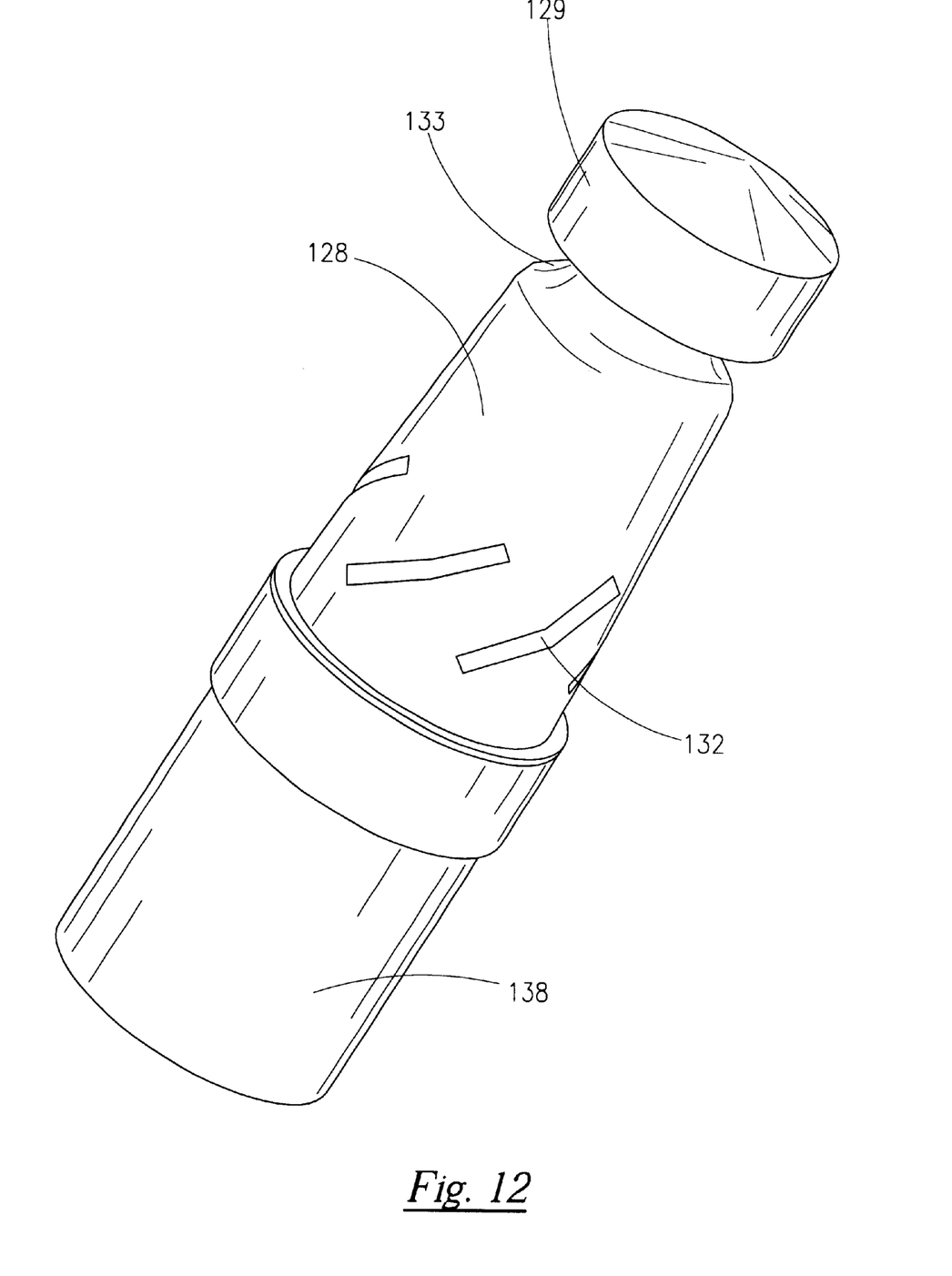
FIG. 12 is showing a perspective view of the filler body of the apparatus according to FIG. 11.
Figure 13:
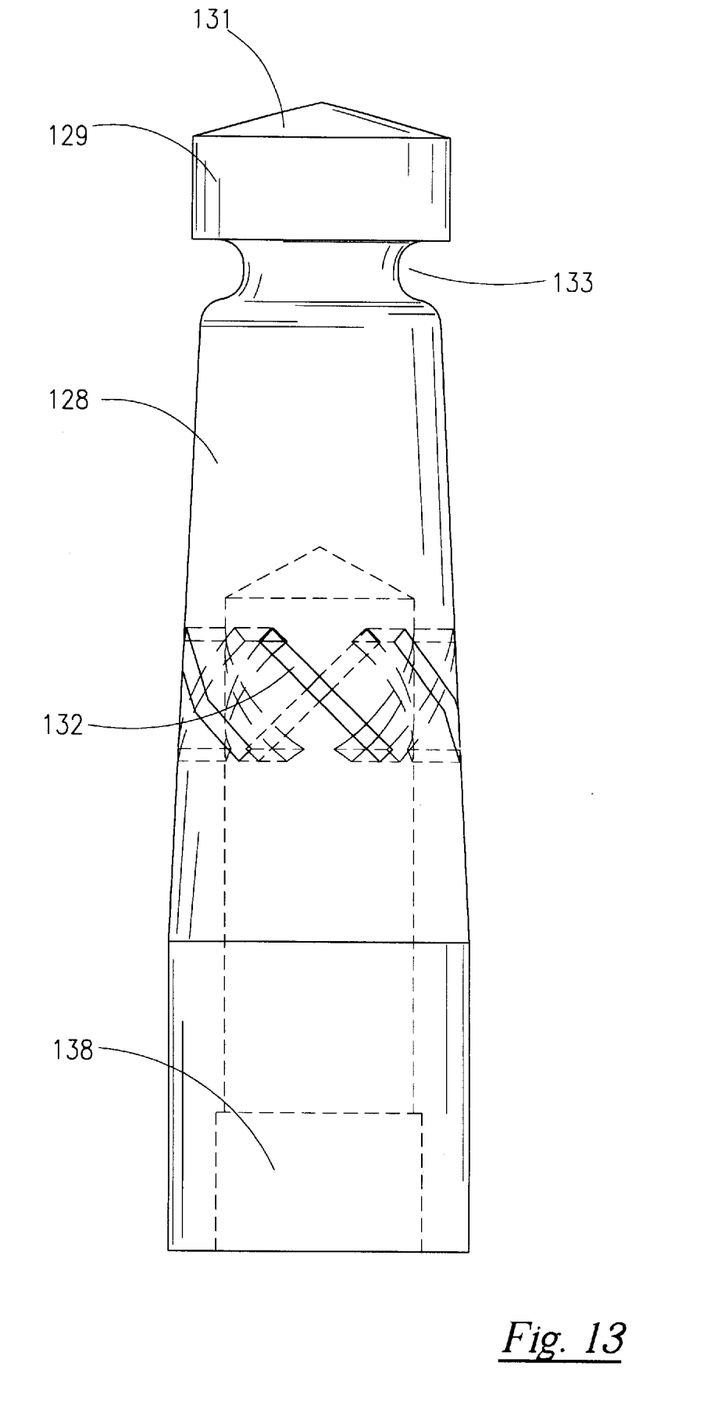
FIG. 13 is showing a representation of the filler body of FIG. 12 in a side view, wherein in dotted lines the contour of the inner cavity is shown.

FIGS. 11 to 13 show an especially preferred embodiment according to the invention. FIG. 11 shows this embodiment in a side view, wherein the inner contours and the contours of the filler body are shown in dotted lines.

This apparatus, too, is having a housing 110 forming a dynamically balanced cavity 112 which conically is enlarging. This cavity 112 in the view according to FIG. 11, on the right hand side, is having a gas entry connector 114. In this case, too, the gas entry connector is circumferentially constricted by a coaxial screen 116 projecting into the open cross-section of the cavity such that a opening concentric to the cavity 112 is formed having a diameter which is smaller than the smallest diameter of the cavity 112. Within the cavity 112, close to the screen 116 and tangentially to the inner lateral area of the housing 110, an auxiliary gas entrance opening 118 is opening. This auxiliary gas entry opening 118 can be of the same construction as the auxiliary gas entry opening 18 in FIG. 2.

In this embodiment, the auxiliary gas entry opening 118 is exactly perpendicular to the central axis 124 of the cavity 112. The auxiliary gas entry opening 118 in this case, however, could be inclined in an angle a between the central axis of the auxiliary gas entry opening and the central axis of the cavity which is slightly larger than 90 degrees as the auxiliary gas entry opening 18 in FIG. 1.

The cavity 112 is continously enlarged with an incline of 6:100 which is corresponding to an angle of 1,72° with respect to the central axis 124 up to its gas exit end. There a filler body 128 is mounted. At its gas entry end, the filler body 128 in this embodiment is provided with a head 129. This head 129 has the shape of a cylindrical disk and is on the gas entry side extended into a flat point 131 in the shape of a cone. The diameter of this head is larger than the largest diameter of the filler body 128 in its rear conical area. The lateral area of the head 129, too, is slightly conical and having a conicalness of 6:100. Downstream of the head, the filler body is having a constriction 133 in which the diameter of the filler body is reduced to less than one third of the diameter of the head. After this constriction 131, the filler body 128 is continued with the conicalness of 6:100, wherein the diameter of the filler body in this section continuously is smaller than the diameter of the head 129 but still substantially is larger than the diameter in the constricted section 133.

About in the middle of the rear conical section of the filler body 128, there are provided nine slanted slots 132 in parallel to each other. In the drawing, for the sake of simplicity, each only one slot is shown. These slots provide the connection between the cavity 112 and a bore 137 which concentrically is provided in the filler body 128. This bore 137 is leading to the gas exit connector 138.

For the sake of clarity, in FIG. 12 the filler body 128 already connected to the gas exit connector 138 is shown again in a perspective view while FIG. 13 is showing the filler body 128 in a side view, wherein, too, the gas exit connector 138 additionally is shown. The inner contours of the bore 137 here are shown in dotted lines.

Figure 14:
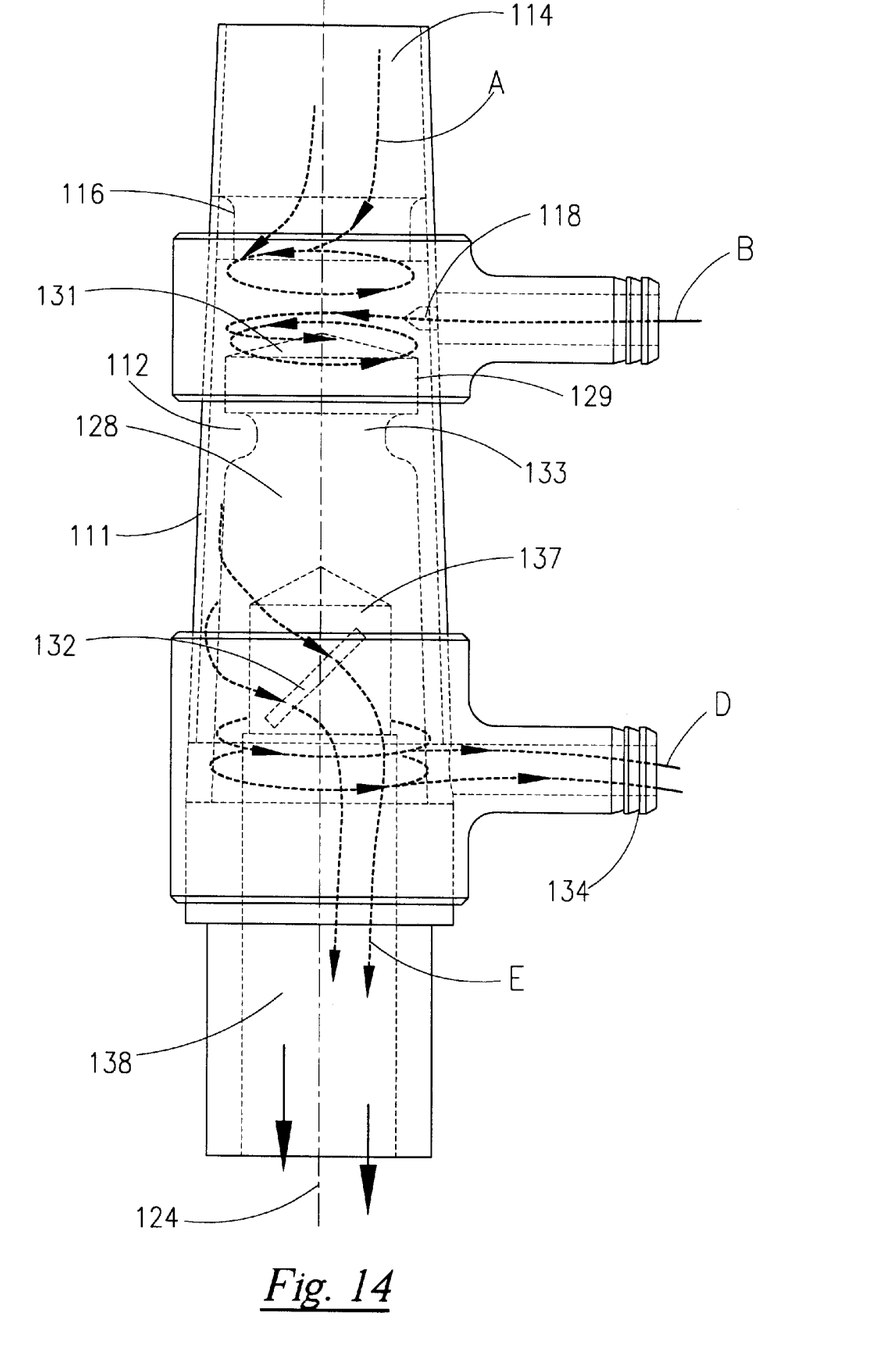
FIG. 14 is showing the function of the apparatus according to FIG. 11.

The function of the aerodynamic filter according to the invention can be learnt from FIG. 14. There the movement of the air is shown in detail by arrows. Here the gas to be cleaned is fed through the gas entry connector 114, as this is shown by the dotted arrows A, into the apparatus according to the invention and is passing the screen 116. There the still uncleaned gas is put into rotation by the auxiliary gas fed through the opening 118 which is acting as a nozzle and which is shown by the solid arrows B. While rotating the mixture of the two gases is passing the head 129 of the filler body 128, wherein the aerosoles contained in the gas mixture are deposited on the inner wall of the housing 110 and are moved to the exit opening 134. The cleaned gas is flowing through the slots 132 into the gas exit connector 138 as this is shown by the dotted arrows E.

Figure 15:
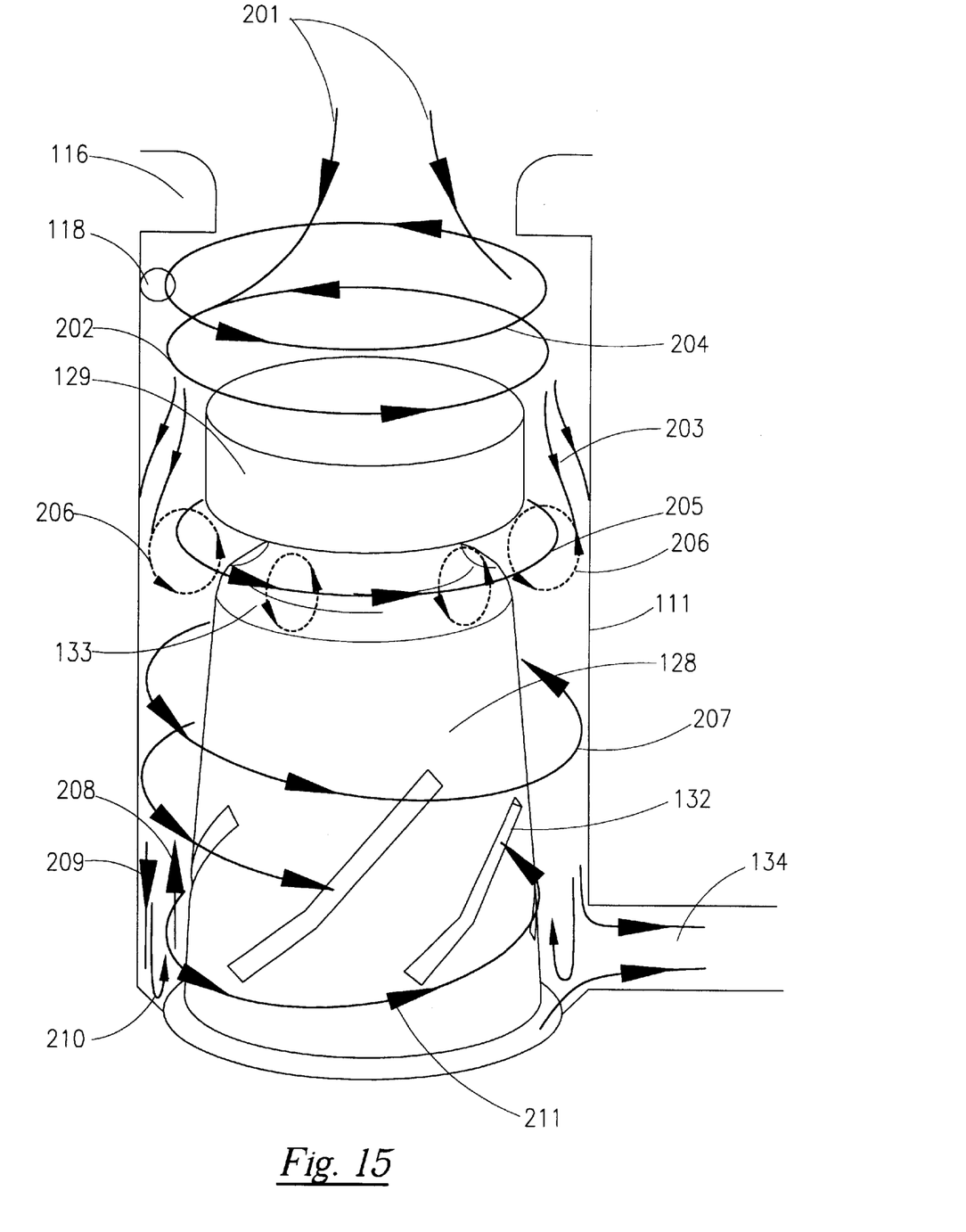
FIG. 15 a detailed view of the flow condition around the filler body of FIG. 14.

FIG. 15 shows in detail the flow path around the filler body 128 of FIG. 14. Here the gas to be cleaned or the gas mixture to be separated is, as shown by the arrows 201, flowing past the baffle 116. In the area behind the baffle 116, the gas mixture streaming in is meeting the auxiliary gas emanating from the auxiliary gas exit opening 118, which, as shown by arrows 204, is circulating at the interior wall of the cavity 112. As shown by arrows 202, the gas mixture streaming in is carried away by the rotating auxiliary gas and begins to rotate, too. As shown by arrows 203, the gas mixture thereafter is flowing past the head 129. The exit velocity of the flow from the auxiliary gas opening 118 here can be remarkably higher compared with usual nozzles due to the fact that the gas not has to flow against a stationary mass of gas but instead is flowing into an already rotating mass of gas.

After therefore the gas mixture has passed the head 129, it is arriving at the constriction 133 in the filler body 128. By this, the gas flow is separated from the interior wall of the cavity 112. During this lift-off, further eddies 206 are formed circulating with the arrows 205. Therefore here a basically torus-shaped flow is created. By this further an improved separation of the particles is achieved which are thrown to the exterior in this torus-shaped flow until they reach the lower ends 210 of the cavity 112 following the interior wall of the housing 110 with the screw-shaped flow 207. The cleaned gas thereafter is flowing along the filler body 122 as shown by arrows 212 and is leaving through the exit slots 132.

Figure 16A:
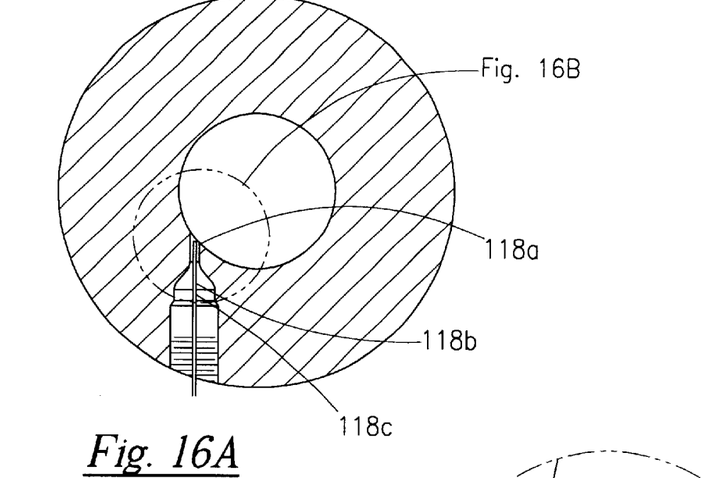
FIG. 16A depicts an auxiliary gas inlet according to the invention if an additional substance should be admixed to the auxiliary gas.
Figure 16B:
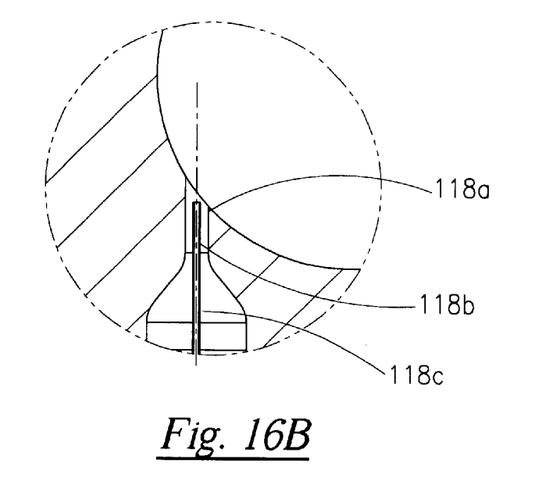
FIG. 16B is an enlarged view of the auxiliary gas inlet seen on FIG. 16A.
Figure 16C:
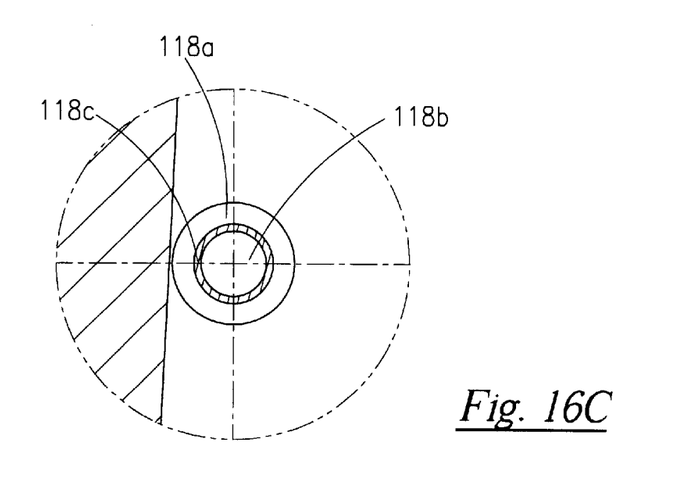
FIG. 16C is a top view of the auxiliary gas inlet seen in FIG. 16B.

According to the invention, the fed-in auxiliary gas can be mixed with a further material, for example in vapour state or in the liquid state. To this end, an apparatus can be used, which is shown in FIGS. 16A, 16B, and 16C. Here by reference numeral 118a, the normal auxiliary gas inlet opening is shown. In this opening, here, additionally, a coaxial tube is inserted through the interior 118b of which additionally for example a vapour or water jet can be admixed to the auxiliary gas. By doing so, for example, a washing of water soluble, gaseous or solid constituents of the streaming in gas mixture can be achieved. In this kind of operation, on the interior wall of the housing 10 a thin fluid film is formed which slowly is moving downwardly and which can be withdrawn at the lower end of the cavity 112.

This mixed mode of operation with gas and liquid or vapour makes it possible, for example, to filter substances, too, as such substances for example are emanating from cyano salt baths. These substances are bound to the liquid and can be regained from the liquid. When cleaning smoke gases, this mixed mode of operation is of advantage, too, because in the liquid, for example water, not only the solid matter is bound but additionally gases, too, as for example $SO_2$ and NOx.

This apparatus can be used, too, for cooling purposes. Doing so, water and air are used as the motive medium because water is atomized when leaving the tube 118c. When getting into the filter, these atomized minute drops by impact are enlarged to a multiple size and the motive air in contact therewith is creating a drastically enlargement of the vaporation speed. This leads to a removal of energy, i.e. to a cooling of the air. By the separation action of the filter, the leaving air is free of atomized droplets but is completely saturated with humidity. Simultaneously, the temperature of the leaving air is much lower. This kind of use of the apparatus especially is suitable for cooling rooms, the temperature of which should not be below zero degrees and which simultaneously are needing a high humidity of the air as, for example, storage space for fresh fruit or vegetable.

Figure 17:
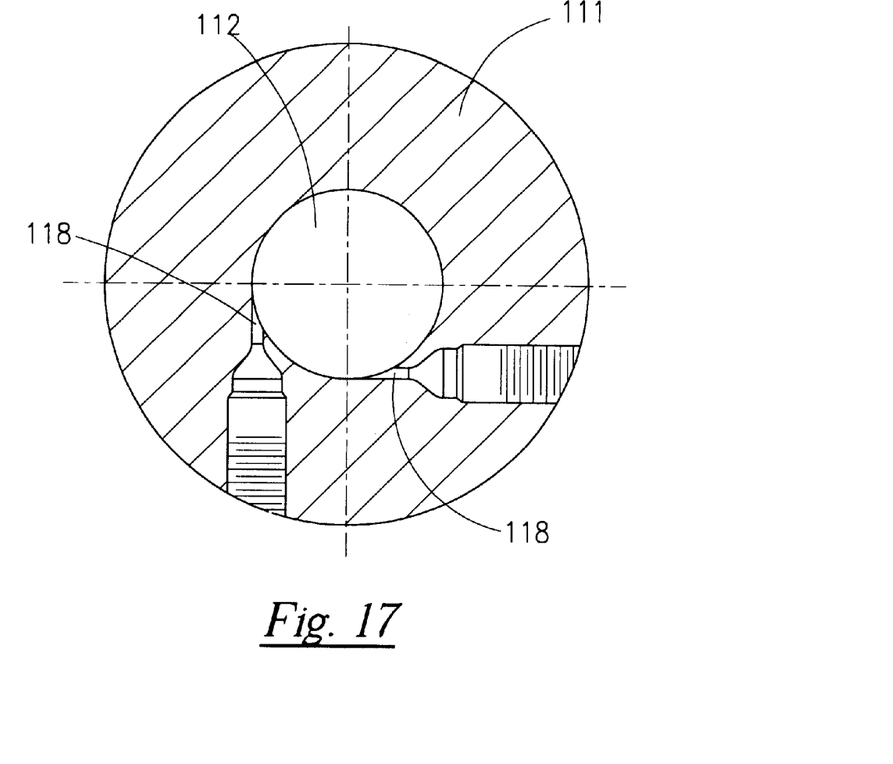
FIG. 17 a sectional view of an apparatus according to the invention having two auxiliary gas inlets positioned side by side, and FIG. 18 an apparatus according to the invention having two auxiliary gas inlets positioned one below the other.

FIG. 17 is showing a further possibility of the admission of the auxiliary gas. Here, too, auxiliary gas inlet openings are provided being separated by 90 degrees. These auxiliary gas inlet openings either can be feeding equal auxiliary gases or a gas and a different medium like water.

Figure 18:
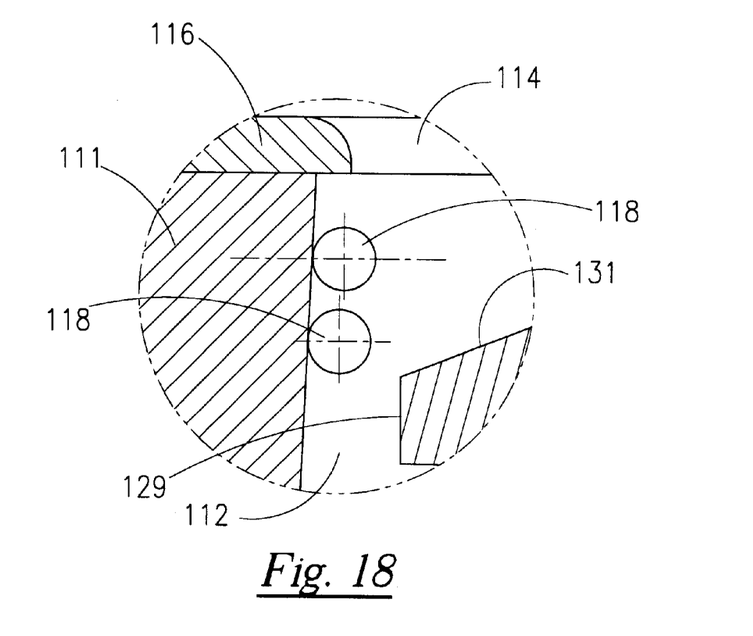

As shown in FIG. 18, the two auxiliary gas inlets could be in the same position but below each other. Possibly further auxiliary gas and auxiliary media inlets can be provided as, for example, two inlets for air and one for water or the like.

The special advantage of this invention lies in the fact that the apparatus is very simply constructed and does not need any movable parts. Even in constant operation, very little maintenance is necessary.

What is claimed is:

1. Apparatus for separating fluids and/or solid matter or gases having a different specific weight from a gas flow, said apparatus having a gas inlet connector and a gas outlet connector, wherein the apparatus has a tube-shaped cavity (12; 112) which conically is enlarged from the gas inlet connector (14; 114) to the gas outlet connector, wherein ans auxiliary gas inlet opening (18; 118) is opening into said cavity in proximity to the gas inlet connector (14; 114) tangentially to the lateral area of said cavity (12; 112).

2. Apparatus according to claim 1, wherein the auxiliary gas entrance opening (18; 118) is inclined with respect to the normal on the central axis (24; 124) of the cavity (12; 112) in the direction of the gas exit connector (38; 138) such, that the auxiliary gas is guided along the lateral area of the cavity (12; 112) in the direction of the gas exit connector (38; 138) in a helical path.

3. Apparatus according to claim 1, wherein coaxially to the cavity (12; 112) there is positioned a filler body (28; 128) having a smaller diameter and a conical shape such that the cavity (12; 112) is a hollow truncated cone shape with generally constant wall thickness.

4. Apparatus according to claim 3, wherein the height of the filler body (28; 128) is less than the height of the auxiliary gas entrance connector (18; 118).

5. Apparatus according to claim 3, wherein the filler body (28) is fastened in the cavity (12) by means of a sealing element (26) which sealingly is closing the cavity (12) in proximity of the gas exit connector (38) and, wherein the filler body (28) is hollow and open in the direction of the gas exit connector (38) and contains a lateral opening (32) for the gas.

6. Apparatus according to claim 5, wherein the opening is an elongated slot extending parallel or inclined to the central axis (24) of the filler body (28).

7. Apparatus according to claim 5, wherein the sealing element (26) is performed as an electric insulator and, wherein the apparatus further comprises a source (36) of direct current electrostatically charges the filler body (28) with respect to the wall of the cavity (12).

8. Apparatus according to claim 5, wherein immediately upstream the sealing element (26) an exit opening (34) is provided in the wall of the cavity (12).

9. Apparatus according to claim 8, wherein only one opening (32) is provided in the filler body (28) and, in that the exit opening (34) is positioned on the opposite side of the filler body (28) with resepct to the opening (32).

10. Apparatus according to claim 1, wherein at the gas entrance connector (14) there is provided a baffle (16) or step restricting the cross-section of the cavity (12).

11. Apparatus according to claim 1, wherein the auxiliary gas entrance opening (18) is provided with a nozzle (20).

12. Apparatus according to claim 1, wherein the gas entrance connector and the gas outlet connector (14, 38), respectively, each are centrally positioned in each one end surface of the cavity (12) and having a truncated cone shape.

13. Apparatus according to claim 2 wherein the central axis of the auxiliary gas entrance opening (18) is positioned at a predetermined angle greater than 90.5 degrees with respect to the central axis (24) of the cavity (12) directed to the gas exit opening (38).

14. Apparatus according to claim 1, wherein the angle of the conical tube-shaped cavity is greater than 0.5 degrees.

15. Apparatus according to claim 1, wherein at the lateral area of the cavity (12) there are provided electric heating resistors for burning off solid matter separated from the gas flow.

16. Apparatus according to claim 15, wherein the electric heating resistors comprise a plurality of helical heater windings or heating bands extending in the direction of flow of the auxiliary gas.

17. Apparatus according to claim 1, wherein a suck-off tube (40) is extending along the central axis (24) of the cavity (12) from the gas exit connector (38) into the cavity (12).

18. Apparatus according to claim 17, wherein the suck-off tube (40) is positioned in the interior of the filler body (28) and is extending close to the end of the filler body (28) on the side of the gas entrance.

19. Apparatus according to claim 18, wherein on the third of the length of the lateral opening(s) (32) on the side of the gas entrance there is provided a sealing (44) between the filler body (28) and the suck-off tube (40).

20. Apparatus according to claim 3, wherein the filler body (128) is provided with a head (129) at the front end which is separated from the remainder of the filler body (128) by a constriction (133).

21. Apparatus according to claim 20, wherein the constriction (133) has a diameter which is less than one third of the diameter of the head (129).

22. Apparatus according to claim 20, wherein the diameter of the head (129) is larger than the diameter of the filler body (128) in the conical section thereof.

23. Apparatus according to claim 20, wherein the head (29) has a flat cylinder shape, wherein the lateral area of said head has the same conicalness as the filler body (128), and wherein the head (129) ends in a flat cone towards the front.

* * * * *